US011226744B2

(12) United States Patent
Hardy et al.

(10) Patent No.: US 11,226,744 B2
(45) Date of Patent: Jan. 18, 2022

(54) DETERMINATION OF A TYPE OF DESTAGE TO PERFORM BASED ON PREFERENCE BETWEEN PERFORMANCE OF OPERATIONS AND PRESERVATION OF DRIVE LIFE

(71) Applicant: INTERNATIONAL BUSINESS MACHINES CORPORATION, Armonk, NY (US)

(72) Inventors: Clint A. Hardy, Tucson, AZ (US); Lokesh Mohan Gupta, Tucson, AZ (US); Karl Allen Nielsen, Tucson, AZ (US); Brian Anthony Rinaldi, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/848,403

(22) Filed: Apr. 14, 2020

(65) Prior Publication Data
US 2021/0318806 A1 Oct. 14, 2021

(51) Int. Cl.
*G06F 3/06* (2006.01)
(52) U.S. Cl.
CPC .......... *G06F 3/0616* (2013.01); *G06F 3/0653* (2013.01); *G06F 3/0655* (2013.01); *G06F 3/0689* (2013.01)
(58) Field of Classification Search
CPC .... G06F 3/0616; G06F 3/0689; G06F 3/0653; G06F 3/0655
See application file for complete search history.

(56) References Cited

U.S. PATENT DOCUMENTS

| 7,958,310 | B2 | 6/2011 | Benhase et al. |
| 9,395,925 | B2 | 7/2016 | Ash et al. |
| 9,524,244 | B2 | 12/2016 | Boden et al. |
| 2008/0168220 | A1 | 7/2008 | Gill et al. |
| 2009/0157974 | A1* | 6/2009 | Lasser ................. G06F 12/0893 711/135 |
| 2010/0174867 | A1 | 7/2010 | Gill et al. |
| 2014/0365725 | A1 | 12/2014 | Barrell et al. |
| 2015/0134914 | A1* | 5/2015 | Ash ....................... G06F 12/123 711/136 |

(Continued)

OTHER PUBLICATIONS

List of IBM Patents or Patent Applications Treated as Related, pp. 2, dated Apr. 14, 2020.

(Continued)

*Primary Examiner* — David Yi
*Assistant Examiner* — Dustin B. Fulford
(74) *Attorney, Agent, or Firm* — Konrad Raynes Davda & Victor LLP; Rabindranath Dutta

(57) ABSTRACT

A first score corresponding to a full stride destage, a second score corresponding to a strip destage, and a third score corresponding to an individual track destage are computed, wherein the first score, the second score, and the third score are computed for a group of Input/Output (I/O) operations based on a first metric and a second metric, wherein the first metric is configured to affect a performance of data transfers, and wherein the second metric is configured to affect a drive life. A determination is made of a type of destage to perform based on the first score, the second score, and the third score.

20 Claims, 16 Drawing Sheets

(56) References Cited

U.S. PATENT DOCUMENTS

| | | |
|---|---|---|
| 2015/0261453 A1 | 9/2015 | Ash et al. |
| 2016/0321190 A1 | 11/2016 | Ash et al. |
| 2017/0054824 A1 | 2/2017 | Friedman et al. |
| 2019/0260204 A1 | 8/2019 | Koval et al. |
| 2019/0317898 A1 | 10/2019 | Gupta et al. |
| 2019/0332471 A1 | 10/2019 | Gupta et al. |

OTHER PUBLICATIONS

U.S. Appl. No. 16/848,411, filed Jan. 14, 2020.
PCT International Search Report and Written Opinion dated Jun. 28, 2021, pp. 9, for Serial No. PCT CN2021/083008.
Response dated Sep. 1, 2021, pp. 11, to Office Action dated Jun. 1, 2021, pp. 31, for U.S. Appl. No. 16/848,403.
Office Action dated Jun. 1, 2021, pp. 31, for U.S. Appl. No. 16/848,403.
Notice of Allowance dated Nov. 5, 2021, p. 21, for U.S. Appl. No. 16/848,411.

* cited by examiner

800

Scoring based on performance factors

802

NVS full or not

If NVS is full then
    increment FullStrideScore by 2 and StripScore by 1;

If NVS is not full then nothing is incremented.

804

Number of IOPS with full stride destage vs. strip destage vs. individual track destage Compute number of IOPS it will take with each option.

If difference in number of IOPS between full stride vs. strip vs. individual tracks is high(>10) then increment FullStrideScore by 2 and StripScore by 1.

If difference in number of IOPS between full stride vs. strip vs. individual tracks is medium (>5) then increment FullStrideScore by 1.

Else if the difference is low (under 5), then increment IndividualTrackScore by 1.

Scoring based on performance factors — 902

Parity lock contention

Compute number of tracks in different strips of the stride that compete for the same parity lock. For example, track 1 (strip 1) will compete with track 5 (strip 2) to update the parity.

If number of tracks in different strips that compete for same parity lock is greater than say 10 then increment FullStrideScore by 2 and StripScore by 1.
Else,
If number of tracks in different strips that compete for same parity lock is greater than say 5 then Increment FullStrideScore by 1.
Else,
If number of tracks in different strips that compete for same parity rock is greater than say 2 then
increment IndividualTrackScore by 1.
Else,
increment IndividualTrackScore by 2 (i.e., below or at 2).

— 904

I/O is sequential or not

If I/O is sequential than Increment FullStrideScore by 2 and StripScore by 1
else increment IndividualTrackScore by 1.

— 906

Data sequentially written on disk or not

If data was previously written sequentially on disk then it is much better to do full stride destage. This can be checked by looking at logical to physical mapping of the tracks.

If logical to physical mapping is in the same order for all the tracks in the stride then data was previously destaged as full stride.

If data sequentially written on disk then increment FullStrideScore by 2 and StripScore by 1
else increment IndividualTrackScore by 1.

Scoring based on performance factors

1002

Unmodified data already present in the stride or needs to be staged (If majority of stride is in cache either modified or unmodified then there is no need to stage as much and that means full stride destage is beneficial and then strip and then individual tracks.)

If total data in cache > 75% of stride size
then Increment FullStrideScore by 2 and StripScore by 1
else total data in cache > 50% of stride size
then increment FullStrideScore by 1
else total data in cache > 25% of stride size
Increment IndividualTrackScore by 1
else (below 25%)
Increment IndividualTrackScore by 2

The embodiments has thresholds at 25%, 50%, 75%. These percentages will vary based on the geometry of the RAID array (RAID 5, RAID-6 etc.)

1004

Bandwidth usage on the rank (If bandwidth usage is high then destaging full stride or strip will hurt performance.)

If bandwidth used > 90% of max bandwidth
then Increment IndividualTrackScore by 2
else if bandwidth used > 70% of max bandwidth
then increment IndividualTrackScore by 1
else if bandwidth used > 50% of max bandwidth
then increment FullStrideScore by 1
else (under 50%)
then increment FullStrideScore by 2 and StripScore by 1.

FIG. 12

1200 Scoring based on drive life factors

1202 Amount of modified data In the stride

(When amount of modified data is more then full stride destage is preferred and then strip destages and then individual track destages.)

If modified data > 75% of stride size
then increment FullStrideScore by 2 and StripScore by 1
else if modified data > 50% of stride size
then increment FullStrideScore by 1
else if modified data > 25% of stride size
then increment IndividualTrackScore by 1
else (below 25%)
increment IndividualTrackScore by 2.

1204 Flash Wear Level

(If flash wear level is high then destaging just the modified data is beneficial)

If flash wear level is high increment IndividualTrackScore by 1
If flash wear level is low increment FullStrideScore by 1 and StripScore by 1.

1206 Write Per Day classification of the drive

(The higher the write per day classification, the more is the data that can be destaged without wearing out the flash. It is better to do full stride destages when write per day classification is high.)

If Write Per Day classification Is low Increment IndividualTrackScore by 1
If Write Per Day classification Is high Increment FullStrideScore by 1 and StripScore by 1.

DETERMINATION OF A TYPE OF DESTAGE TO PERFORM BASED ON PREFERENCE BETWEEN PERFORMANCE OF OPERATIONS AND PRESERVATION OF DRIVE LIFE

BACKGROUND

1. Field

Embodiments relate to the determination of a type of destage to perform based on preference between performance of operations and preservation of drive life.

2. Background

In certain storage system environments, a storage controller (or a storage controller complex) may comprise a plurality of storage servers that are coupled to each other. The storage controller allows host computing systems to perform input/output (I/O) operations with storage devices controlled by the storage controller, where the host computing systems may be referred to as hosts.

The storage controller may include two or more servers, where each server may be referred to as a node, a storage server, a processor complex, a Central Processor Complex (CPC), or a Central Electronics Complex (CEC). Each server may have a plurality of processor cores and the servers may share the workload of the storage controller. In a two server configuration of the storage controller that is also referred to as a dual-server based storage controller, in the event of a failure of one of the two servers, the other server that has not failed may take over the operations performed by the failed server.

Data written from a host may be stored in the cache of the storage controller, and at an opportune time the data stored in the cache may be destaged (i.e., moved or copied) to a storage device. Data may also be staged (i.e., moved or copied) from a storage device to the cache of the storage controller. The storage controller may respond to a read I/O request from the host from the cache, if the data for the read I/O request is available in the cache, otherwise the data may be staged from a storage device to the cache for responding to the read I/O request. A write I/O request from the host causes the data corresponding to the write to be written to the cache, and then at an opportune time the written data may be destaged from the cache to a storage device. Since the storage capacity of the cache is relatively small in comparison to the storage capacity of the storage devices, data may be periodically destaged from the cache to create empty storage space in the cache. Data may be written and read from the cache much faster in comparison to reading and writing data from a storage device.

In computer data storage, data striping is the technique of segmenting logically sequential data, such as a file, so that consecutive segments are stored on different physical storage devices such as disks. The segments of sequential data written to or read from a disk before the operation continues on the next disk are usually called chunks, strides or stripe units, while their logical groups forming single striped operations are called strips or stripes.

Striping is used across disk drives in Redundant array of Independent disks (RAID) storage. RAID is a data storage virtualization technology that combines multiple physical disk drive components into one or more logical units for the purposes of data redundancy and performance improvement. Data is distributed across the drives in one of several ways, referred to as RAID levels, depending on the required level of redundancy and performance. The different schemes, or data distribution layouts, are named by the word "RAID" followed by a number, for example RAID 0 or RAID 1. Each scheme, or RAID level, provides a different balance among the key goals of reliability, availability, performance, and capacity. RAID levels greater than RAID 0 provide protection against unrecoverable sector read errors, as well as against failures of whole physical drives via parity information that is maintained for stored data. A strip is a term that is related to a single disk, and is a predefined number of contiguous addressable blocks in that disk. A stripe comes in action in case of a RAID set, and it is the set of strips spanning across all the drives in that RAID set.

Summary Of The Preferred Embodiments

Provided are a method, system, and computer program product in which a first score corresponding to a full stride destage, a second score corresponding to a strip destage, and a third score corresponding to an individual track destage are computed, wherein the first score, the second score, and the third score are computed for a group of Input/Output (I/O) operations based on a first metric and a second metric, wherein the first metric is configured to affect a performance of data transfers, and wherein the second metric is configured to affect a drive life. A determination is made of a type of destage to perform based on the first score, the second score, and the third score.

In additional embodiments, the first metric that is configured to affect the performance of data transfers includes I/O operations and bandwidth on a rank, non-volatile storage (NVS) capacity, parity lock contention, holes, and unmodified data in a stride.

In further embodiments, the second metric that is configured to affect the drive life includes a wear level of a drive, writes per day classification of the drive, and an amount of modified data in the stride.

In certain embodiments, in response to determining that the first score is a highest score among the first score, the second score and the third score, the full stride destage is performed.

In certain embodiments, in response to determining that the second score is a highest score among the first score, the second score and the third score, the strip destage is performed.

In certain embodiments, in response to determining that the third score is a highest score among the first score, the second score and the third score, the individual track destage is performed.

In further embodiments, a first weightage for the first metric, and a second weightage for the second metric are read from a configuration data structure. The computing of the first score, the second score, and the third score is based on the first weightage being provided to first subscores that are computed based on the first metric, and second weightage being provided to second subscores that are computed based on the second metric.

BRIEF DESCRIPTION OF THE DRAWINGS

Referring now to the drawings in which like reference numbers represent corresponding parts throughout:

FIG. 8 illustrates a block diagram for scoring based on performance factors, in accordance with certain embodiments;

FIG. 9 illustrates a block diagram for scoring based on performance factors, in accordance with certain embodiments;

FIG. 10 illustrates a block diagram for scoring based on performance factors, in accordance with certain embodiments;

FIG. 12 illustrates a block diagram for scoring based on drive life factors, in accordance with certain embodiments;

DETAILED DESCRIPTION

Figure 1:
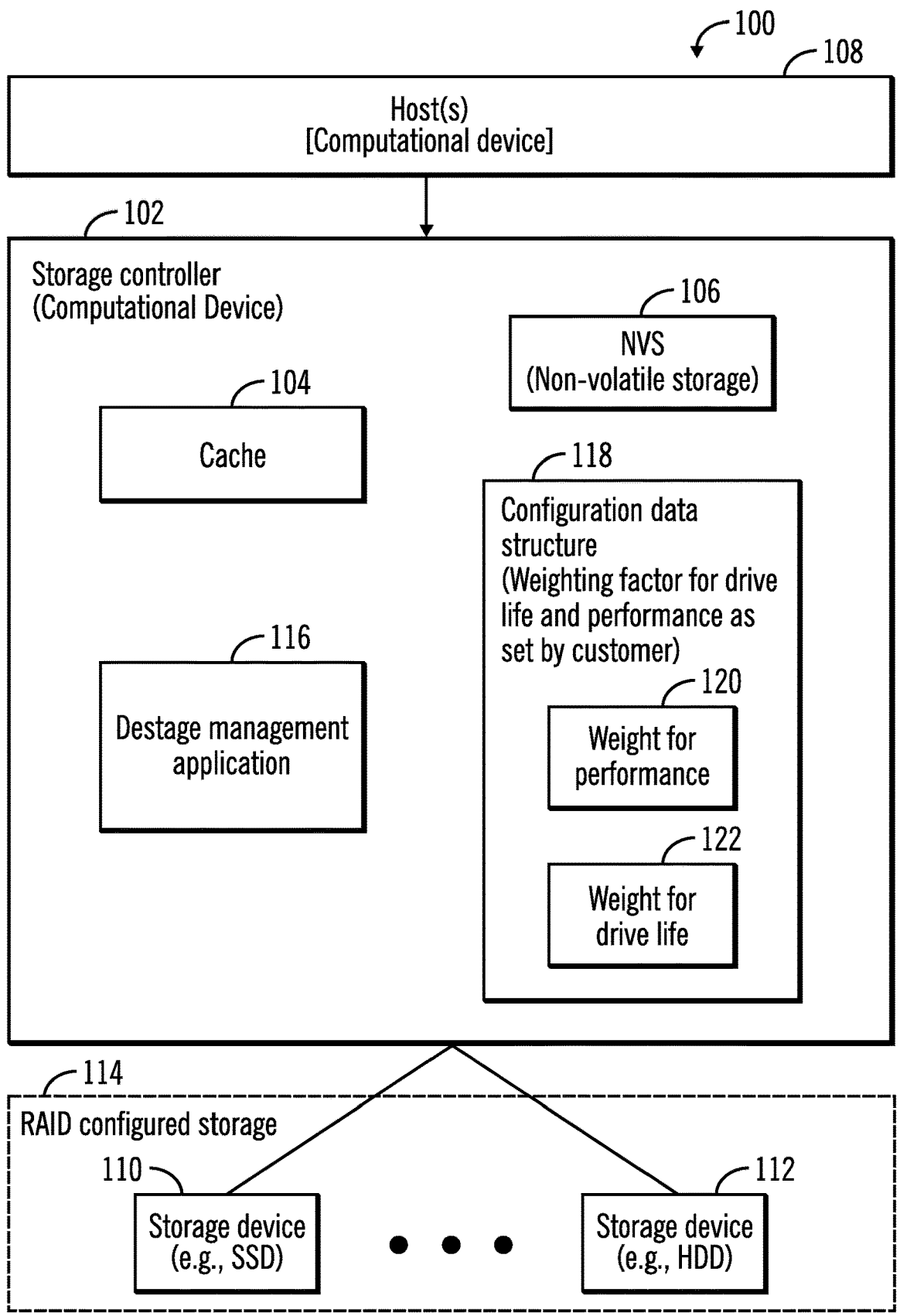
FIG. 1 illustrates a block diagram of a computing environment comprising a storage controller coupled to one or more hosts and one or more storage devices, in accordance with certain embodiments.

In the following description, reference is made to the accompanying drawings which form a part hereof and which illustrate several embodiments. It is understood that other embodiments may be utilized and structural and operational changes may be made.

In certain embodiments, a storage controller may perform full stride destages or destages that are not full stride destages (e.g., strip destage or individual track destage) based on various factors that affect performance of destages and drive life. In a full stride destage all of the data and the parity in all of the strides (or stripes) are written during destage. In a strip destage, one or more strips are written during destage. In a track destage, one or more tracks are written during destage.

While performing destages, a number of factors may affect the performance of destages and the drive life, where the performance refers to how fast destages are completed, and the drive life refers to the life expectancy or endurance of the drives. Such factors that affect performance of the destages and the drive life include:

1. Non-volatile storage (NVS) full or not;
2. Amount of modified data in the stride;
3. Parity lock contention;
4. I/O is sequential or not;
5. Data sequentially written on disk or not;
6. Unmodified data already present in the stride or needs to be staged;
7. Bandwidth usage on the rank;
8. Number of I/O operations per second (IOPS) currently on the rank;
9. Number of holes in the stride;
10. Flash Wear Level;
11. Write Per Day classification of the drive;
12. Number of IOPS with full stride destage vs strip destage vs individual track destage; and
13. Response time for stages/destages on the rank.

A customer may prefer to strike a balance between the drive life and the performance of the destage operations. In certain embodiments, a storage controller determines whether to perform full stride destages or not perform full stride destages (e.g., strip destage or individual track destage) based on factors that affect performance and based on factors that affect the drive life.

Some of the factors influence drive endurance (i.e., life of the drives) whereas others affect performance. Certain customers may prefer performance over drive life whereas others may prefer drive life over performance. Certain embodiments compute separate scores for performance and drive life based on a plurality of factors and enable configuration settings to decide which scores to favor for a particular customer.

Certain embodiments calculate a score for full stride destages, strip destages, and individual track destages for a group of I/O operations based on metrics, which optimizes the life of flash drives that form secondary storage, and metrics, which optimizes the performance of the data transfers, wherein the metrics for drive life includes the wear level and writes per day classification of the flash drive, and the amount of modified data in the stride and the metrics for performance includes I/O operations and bandwidth on the rank, NVS storage capacity, parity lock contention, holes, and unmodified data in the stride. A selection of a type of destage to perform is based on the calculated score, which optimizes the drive life of the flash drives, and also optimizes the performance of the data transfers for the destages. As a result, improvements are made in the operations of a storage controller.

Exemplary Embodiments

FIG. 1 illustrates a block diagram of a computing environment 100 comprising a storage controller 102 with a cache 104 and a non-volatile storage (NVS) 106, coupled to one or more hosts 108 and one or more storage devices 110, 112, in accordance with certain embodiments. The one or more storage devices 110, 112 may form a RAID configured storage 114.

The storage controller 102 allows the one or more hosts 108 to perform input/output (I/O) operations with logical storage maintained by the storage controller 102. The physical storage corresponding to the logical storage may be found in one or more of the storage devices 110, 112 and/or cache 104 and/or non-volatile storage (NVS) 106 of the storage controller 102.

The storage controller 102 and the hosts 108 may comprise any suitable computational device including those presently known in the art, such as, a personal computer, a workstation, a server, a mainframe, a hand held computer, a palm top computer, a telephony device, a network appliance, a blade computer, a processing device, a controller, etc. In certain embodiments, the storage controller 102 may be comprised of a plurality of servers. The plurality of servers may provide redundancy because if one server undergoes a failure from which recovery is not possible, an alternate server may perform the functions of the server that failed. Each of the plurality of servers may be referred to as a processing complex and may include one or more processors and/or processor cores.

The storage controller 102 and the one or more hosts 108 may be elements in any suitable network, such as, a storage area network, a wide area network, the Internet, an intranet. In certain embodiments, storage controller 102 and the one or more hosts 108 may be elements in a cloud computing environment.

The cache 104 and the non-volatile storage 106 may be any suitable memory known in the art or developed in the future. The cache 104 and the non-volatile storage 106 may be distributed among two servers in a dual-server configuration of the storage controller 102. A destage management application 116 that is implemented in software, hardware, firmware or any combination thereof in the storage controller 102 may control destage operations from the storage controller 102 to secondary storage comprising the storage devices 110, 112.

The plurality of storage devices 110, 112 may be comprised of any storage devices known in the art. For example, the storage device 110 may be a solid state drive (SSD) and the storage device 112 may be a hard disk drive (HDD).

A configuration data structure 118 that provides a weight for performance of I/O operations (as shown via reference numeral 120) and a weight for drive life (as shown via reference numeral 122) may be maintained by the storage controller 102, where the weights are populated by the a customer or administrator or user to indicate whether to prioritize drive life over the performance of I/O operations or whether to prioritize performance of I/O operations over drive life. It should writes lower the drive life of a drive (particularly in the case of flash drives such as solid state drives).

Figure 2:
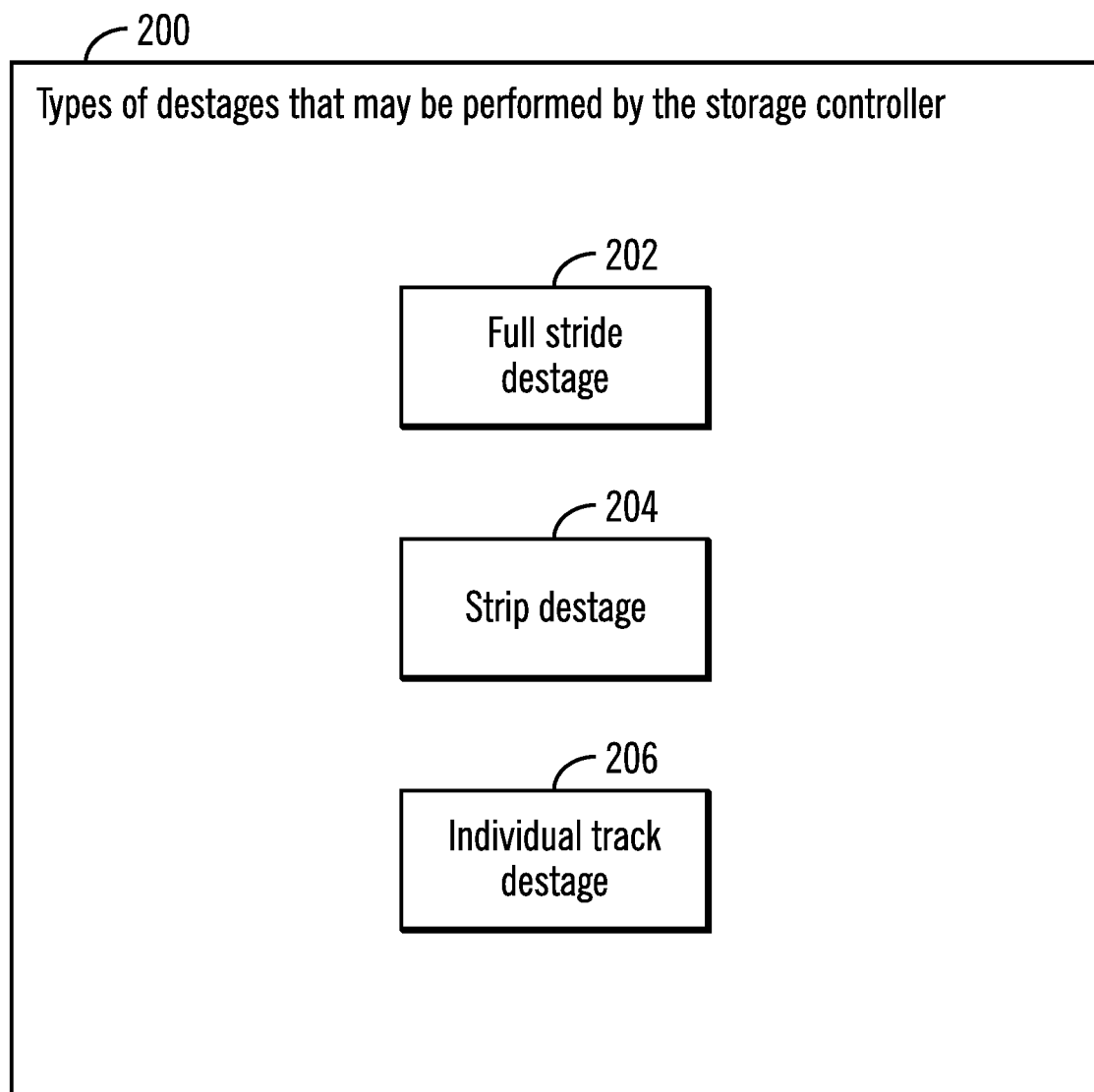
FIG. 2 illustrates a block diagram that shows the types of destages that may be performed by the storage controller, in accordance with certain embodiments.

FIG. 2 illustrates a block diagram 200 that shows the types of destages that may be performed by the storage controller 102 that has stored data in a RAID configuration, in accordance with certain embodiments. The types of destages include a full stride destage 202, a strip destage 204, and individual track destage 206.

In full stride destage 202 all strides are destaged. In strip destage 204 selected strips are destaged. In individual track destage 206, selected tracks are destaged. It should be noted that a strip is comprised of a plurality of tracks.

Figure 3:
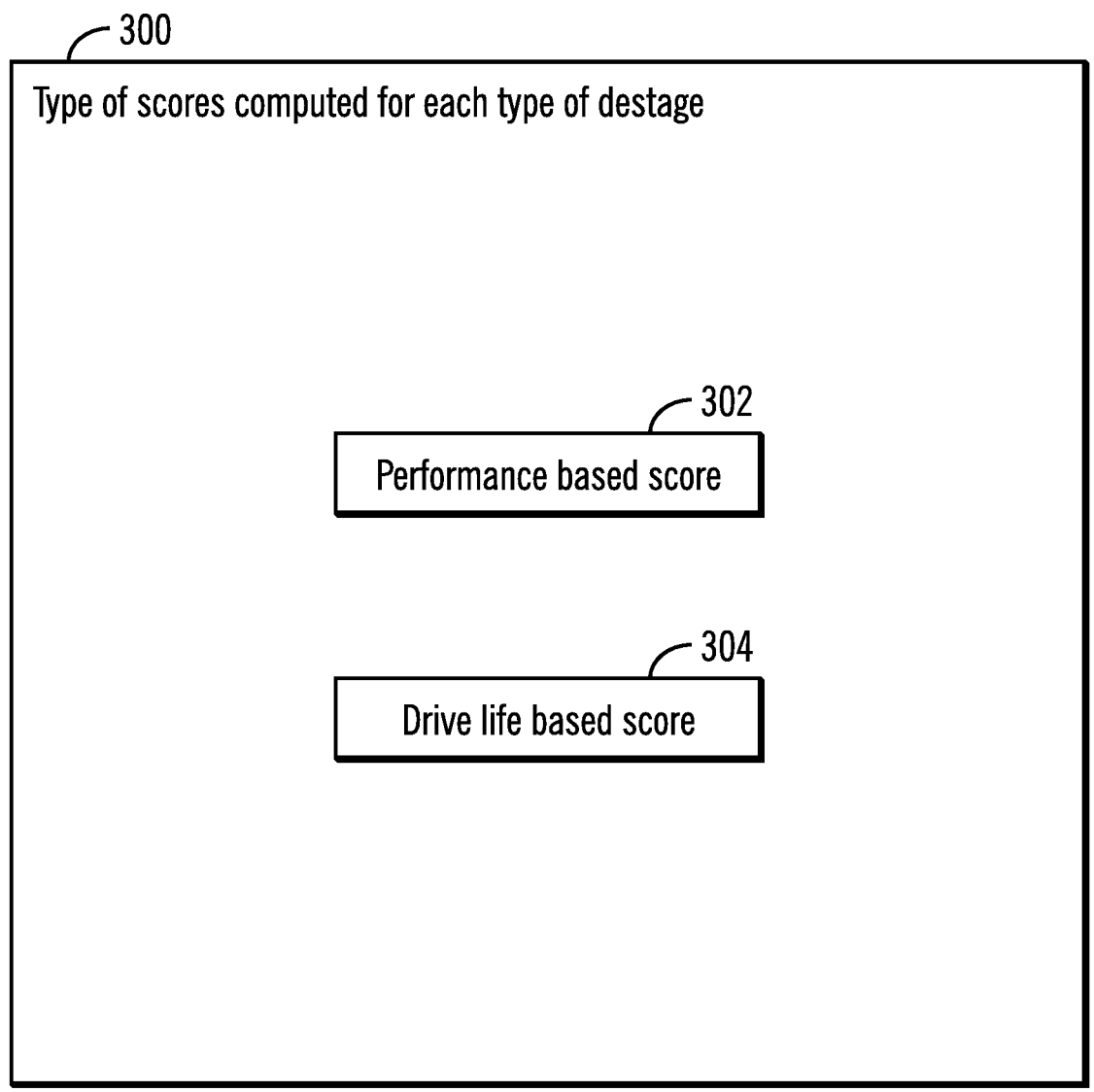
FIG. 3 illustrates a block diagram that shows the types of scores computed for each type of destage, in accordance with certain embodiments.

FIG. 3 illustrates a block diagram that shows the types of scores computed for each type of destage, in accordance with certain embodiments. The types of scores for each type of destage (full stride destage 202, strip destage 204, individual track destage 206) that are computed include a performance based score 302 and a drive life based score 304. The performance based score 302 is based on factors that affect disk I/O operations, and the drive life based score 304 is based on factors that affect the endurance (i.e., the life) of disks.

Figure 4:
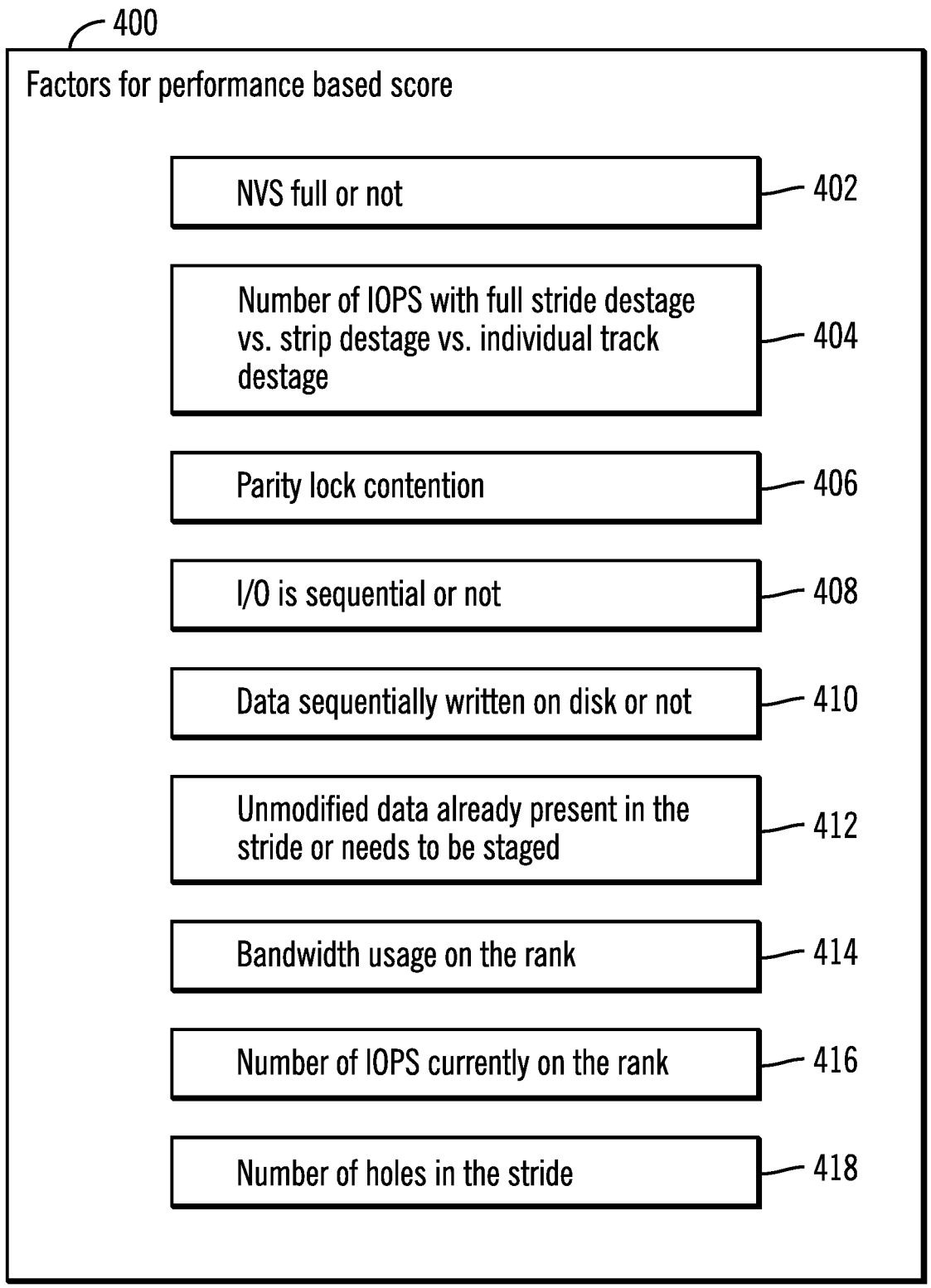
FIG. 4 illustrates a block diagram that shows factors for performance based scores, in accordance with certain embodiments.

FIG. 4 illustrates a block diagram 400 that factors for performance based scores, in accordance with certain embodiments. The factors for performance based scores include the following:
1. NVS full or not (reference numeral 402);

2. Number of I/O operations per second (IOPS) with full stride destage vs. strip destage vs. individual track destage (reference numeral 404);
3. Parity lock contention (reference numeral 406);
4. I/O is sequential or not (reference numeral 408);
5. Data sequentially written on disk or not (reference numeral 410);
6. Unmodified data already present in the stride or needs to be staged (reference numeral 402);
7. Bandwidth usage on the rank (reference numeral 412);
8. Number of IOPS currently on the rank (reference numeral 414); and
9. Number of holes in the stride (reference numeral 416).

Further details of each of these performance factors will be described later in the disclosure. Each of the performance factors directly or indirectly affects the performance of disk I/O during destage operations.

Figure 5:
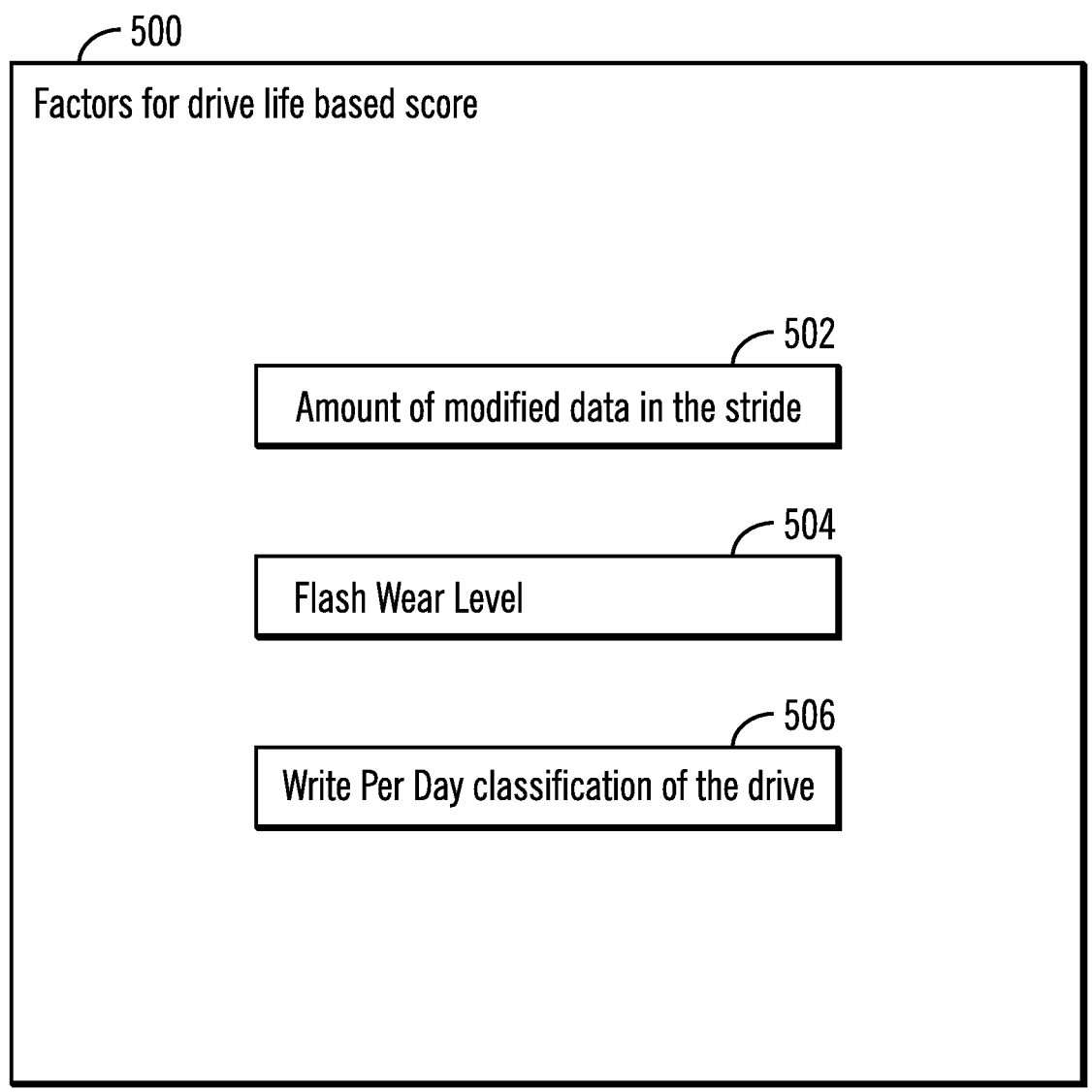
FIG. 5 illustrates a block diagram that shows factors for drive life based scores, in accordance with certain embodiments.

FIG. 5 illustrates a block diagram 500 that shows factors for drive life based scores, in accordance with certain embodiments. The factors for drive life based scores include the following:
1. Amount of modified data in the stride (reference numeral 502);
2. Flash Wear Level (reference numeral 504); and
3. Write Per Day classification of the drive (reference numeral 506).

Figure 6:
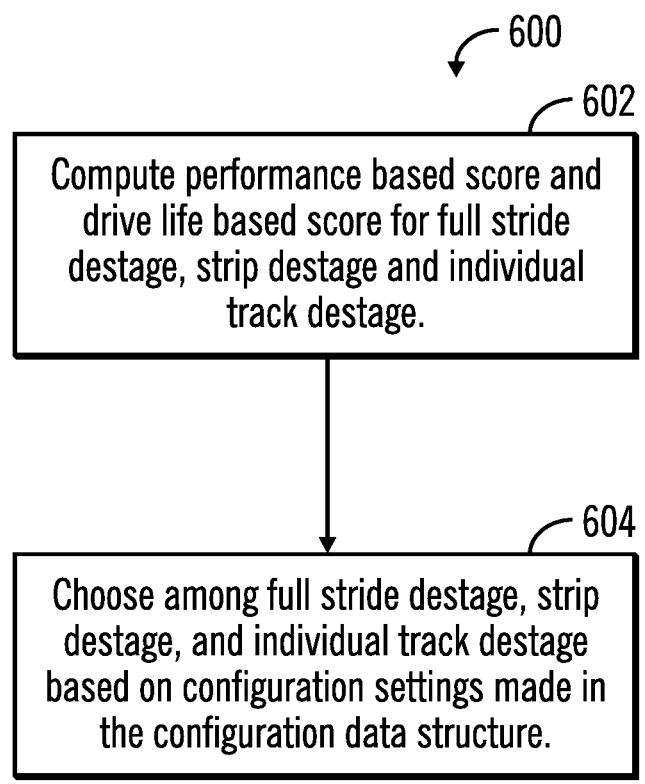
FIG. 6 illustrates a flowchart for selecting a type of destage to perform, in accordance with certain embodiments.

Further details of each of these drive life factors will be described later in the disclosure. Each of the performance factors directly or indirectly affects the drive life during destage operations, FIG. 6 illustrates a flowchart 600 for selecting a type of destage to perform, in accordance with certain embodiments. In certain embodiments, the operations shown in FIG. 6 may be performed by the destage management application 116 that executes in the storage controller 102.

Control starts at block 602 in which the destage management application 116 computes performance based score 302 and drive life based score 304 for full stride destage 202, strip destage 204, and individual track destage 206. Control proceeds to block 604 in which the destage management application 116 chooses among full stride destage 202, strip destage 204, and individual track destage 206 based on configuration settings made in the configuration data structure 118. For example, if the weight for performance 120 is greater than the weight for drive life 122, then the performance based score 302 is weighted more than the drive life based score 304.

As result, optimization is done for performance and drive life based on indications provided by a customer in the configuration data structure 118. For example, the full stride destage may be optimal in certain embodiments to adhere to the indications provided by the customer, whereas in other embodiments the stripe destage or the individual track destage may be optimal.

Figure 7:
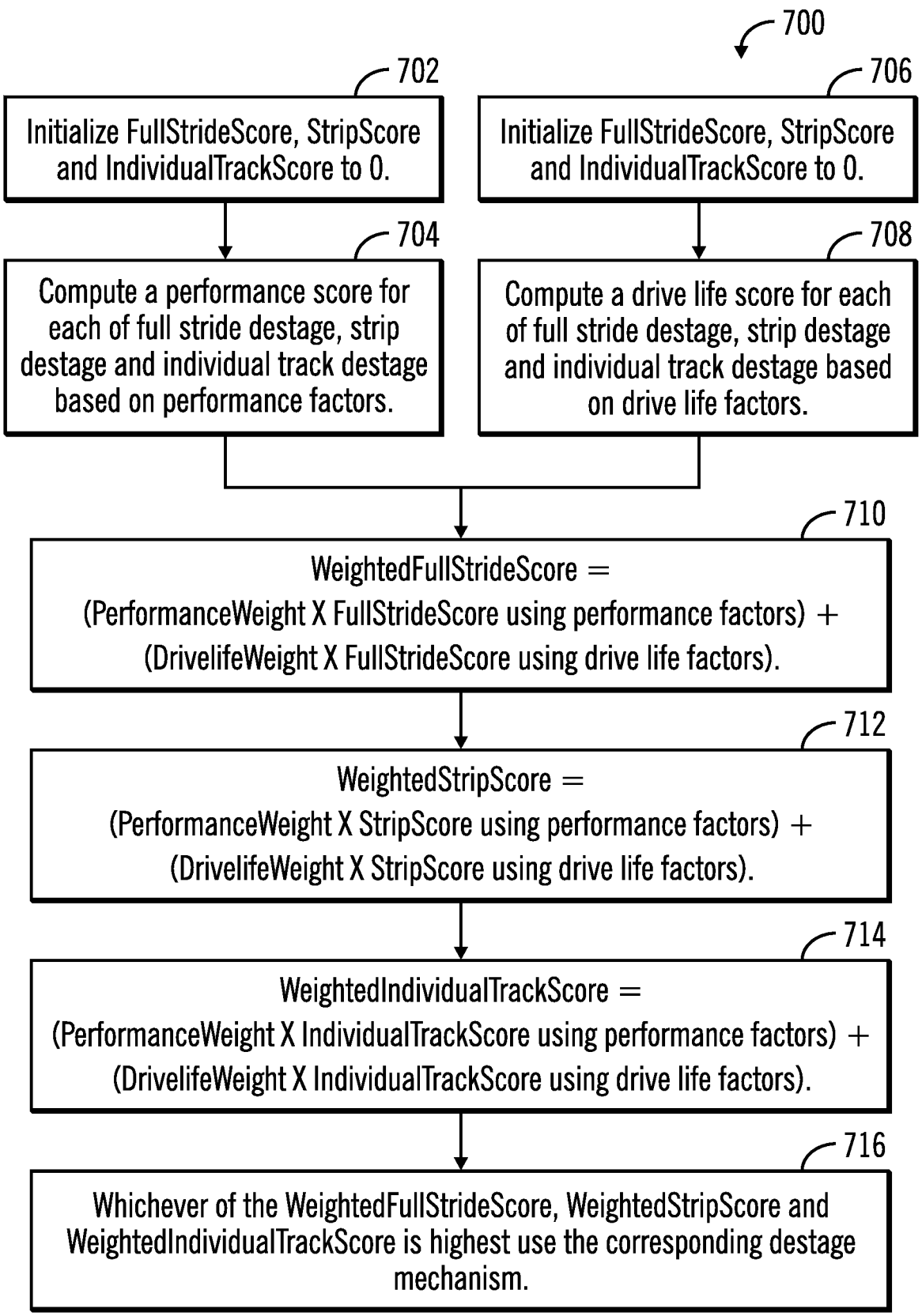
FIG. 7 illustrates a flowchart for selecting a type of destage to perform, in accordance with certain embodiments.

FIG. 7 illustrates a flowchart 700 for selecting a type of destage to perform, in accordance with certain embodiments. In certain embodiments, the operations shown in FIG. 7 may be performed by the destage management application 116 that executes in the storage controller 102.

Control starts at block 702 in which a process initializes the variables FullStrideScore, StripScore and IndividualTrackScore to 0 and then computes (at block 704) a performance score for each of full stride destage, strip destage and individual track destage based on performance factors.

Control also starts at block 706 (in parallel to block 702) in which a process initializes the variables FullStrideScore, StripScore and IndividualTrackScore to 0 and then computes (at block 708) a drive life score for each of full stride destage, strip destage and individual track destage based on drive life factors.

On completion of block 704 and 708 control proceeds to block 710 in which a process computes a weighted full stride score as follows:

WeightedFullStrideScore=(PerformanceWeight×FullStrideScore using performance factors)+(DrivelifeWeight×FullStrideScore using drive life factors).

The PerformanceWeight is the weight for performance 120, and the DrivelifeWeight is the weight for drive life 122 provided in the configuration data structure 118.

On completion of block 710 control proceeds to block 712 in which a process computes a weighted strip score as follows:

WeightedStripScore=(PerformanceWeight×StripScore using performance factors)+(DrivelifeWeight×StripScore using drive life factors).

On completion of block 712, control proceeds to block 714 in which a process computes a weighted individual track scores as follows:

WeightedIndividualTrackScore=(Performance-Weight×IndividualTrackScore using performance factors)+(DrivelifeWeight×IndividualTrackScore using drive life factors).

From block 714 control proceeds to block 716 in which a process determines whichever of the WeightedFullStrideScore, WeightedStripScore and WeightedIndividualTrackScore is highest and uses the corresponding destage mechanism. For example, if the WeightedFullStrideScore is highest then full stride destage is performed.

FIGS. 8-11 provides details for operations shown in block 704 of FIG. 7, after initializing the FullStrideScore, StripScore and IndividualTrackScore to 0. These scores are incremented in the operations shown in FIGS. 8-11 that are described sequentially. The operations are shown in pseudocode and self-explanatory. It should be noted that alternative embodiments may compute the scores in a different way, and the ones shown in FIGS. 8-11 are examples.

FIG. 8 illustrates a block diagram 800 for scoring based on performance factors, in accordance with certain embodiments.

Block 802 describes the performance factor of NVS full or not (shown via reference numeral 402 in FIG. 4) via the following pseudocode:

If NVS is full then
    increment FullStrideScore by 2 and StripScore by 1;
If NVS is not full then nothing is incremented.

Block 804 describes the performance factor of number of IOPS with full stride destage vs strip destage vs individual track destage (shown via reference numeral 404 in FIG. 4) via the following pseudocode:

Compute number of IOPS it will take with each option.
If difference in number of IOPS between full stride vs strip vs individual tracks is high (>10) then increment FullStrideScore by 2 and StripScore by 1.
If difference in number of IOPS between full stride vs strip vs individual tracks is medium (>5) then increment FullStrideScore by 1.
Else if the difference is low (under 5), then increment IndividualTrackScore by 1.

FIG. 9 illustrates a block diagram 900 for scoring based on performance factors, in accordance with certain embodiments.

Block 903 describes the performance factor of parity lock contention (shown via reference numeral 406 in FIG. 4) via the following pseudocode:

Compute number of tracks in different strips of the stride that compete for the same parity lock. For example, track1 (strip 1) will compete with track 5 (strip 2) to update the parity.
If number of tracks in different strips that compete for same parity lock is greater than say 10 then increment FullStrideScore by 2 and StripScore by 1.
Else,
If number of tracks in different strips that compete for same parity lock is greater than say 5 then Increment FullStrideScore by 1.
Else,
If number of tracks in different strips that compete for same parity rock is greater than say 2 then
increment IndividualTrackScore by 1.
Else,
increment IndividualTrackScore by 2 (i.e., below or at 2)

Block 904 describes the performance factor of I/O is sequential of not (shown via reference numeral 408 in FIG. 4) via the following pseudocode:

If I/O is sequential than Increment FullStrideScore by 2 and StripScore by 1
else increment IndividualTrackScore by 1

Block 906 describes the performance factor of data sequentially written on disk or not (shown via reference numeral 410 in FIG. 4). If data was previously written sequentially on disk then it is much better to do full stride destage. This can be checked by looking at logical to physical mapping of the tracks. If logical to physical mapping is in the same order for all the tracks in the stride then data was previously destaged as full stride. The pseudocode is as follows:

If data sequentially written on disk then increment FullStrideScore by 2 and StripScore by 1
else increment IndividualTrackScore by 1.

FIG. 10 illustrates a block diagram 1000 for scoring based on performance factors, in accordance with certain embodiments.

Block 1002 describes the performance factor of unmodified data being already present in the stride or needs to be staged (shown via reference numeral 412 in FIG. 4). In such a case, if majority of stride is in cache either modified or unmodified then there is no need to stage as much and that means full stride destage is beneficial and then strip and then individual tracks. The pseudocode is as follows:

If total data in cache> 75% of stride size
    then increment FullStrideScore by 2 and StripScore by 1
    else total data in cache > 50% of stride size
then increment Full StrideS core by 1
else total data In cache > 25% of stride size
Increment IndividualTrackScore by 1
else (below 25%)
Increment IndividualTrackScore by 2.

The embodiments have thresholds at 25%, 50%, 75%. These percentages may vary based on the geometry of the RAID array (RAID 5, RAID-6 etc.)

Block 1004 describes the performance factor of bandwidth usage on the rank (shown via reference numeral 414 in FIG. 4). In such a situation, if bandwidth usage is high then destaging full stride or strip will hurt performance. The pseudocode is as follows:

```
If bandwidth used > 90% of max bandwidth
    then Increment IndividualTrackScore by 2
else if bandwidth used > 70% of max bandwidth
    then increment IndividualTrackScore by 1
else if bandwidth used > 50% of max bandwidth
    then increment FullStrideScore by 1
else (under 50% )
    then increment FullStrideScore by 2 and StripScore by 1
```

Figure 11:
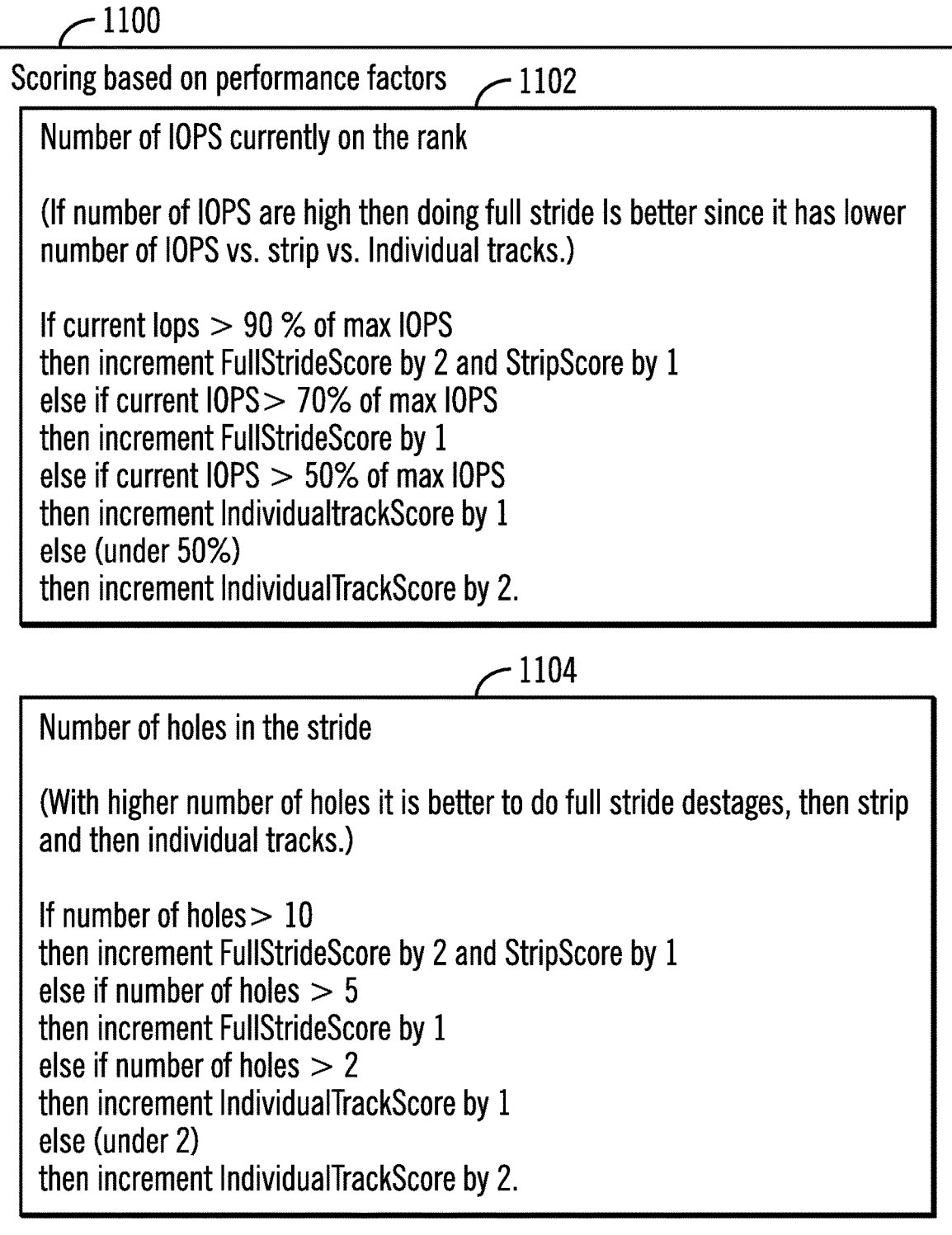
FIG. 11 illustrates a block diagram for scoring based on performance factors, in accordance with certain embodiments.

FIG. 11 illustrates a block diagram 1100 for scoring based on performance factors, in accordance with certain embodiments.

Block 1102 describes the performance factor Number of IOPS currently on the rank (shown via reference numeral 416 in FIG. 4). If number of IOPS are high then doing full stride is better since it has lower number of IOPS vs. strip vs. Individual tracks. The pseudocode is as follows:

```
If current Iops > 90% of max IOPS
    then increment FullStrideScore by 2 and StripScore by 1
else if current IOPS> 70% of max IOPS
    then increment FullStrideScore by 1
else if current IOPS > 50% of max IOPS
    then increment IndividualTrackScore by 1
else (under 50%)
    then increment IndividualTrackScore by 2
```

Block 1104 describes the performance factor of "number of holes in the stride" (shown via reference numeral 418 in FIG. 4). With higher number of holes it is better to do full stride destages, then strip and then individual tracks. The pseudocode is as follows:

```
If number of holes> 10
    then increment FullStrideScore by 2 and StripScore by 1
else if number of holes > 5
    then increment FullStrideScore by 1
else if number of holes > 2
    then increment IndividualTrackScore by 1
else (under 2)
    then increment IndividualTrackScore by 2.
```

FIG. 12 illustrates a block diagram 1200 for scoring based on drive life factors, in accordance with certain embodiments. FIG. 12 provides details for operations shown in block 708 of FIG. 7, after initializing the FullStrideScore, StripScore and IndividualTrackScore to 0. These scores are incremented in the operations shown in FIG. 12 that are described sequentially.

Block 1202 describes the drive life factor of "amount of modified data in the stride" (shown via reference numeral 502 in FIG. 5). When amount of modified data is more than full stride is preferred and then strip destages and then individual tracks. The pseudocode is as follows:

```
If modified data > 75% of stride size
    then increment FullStrideScore by 2 and StripScore by 1
else if modified data > 50% of stride size
    then increment FullStrideScore by 1
else if modified data > 25% of stride size
    then increment IndividualTrackScore by 1
else (below 25%)
    increment IndividualTrackScore by 2.
```

Block 1204 describes the drive life factor of "Flash Wear Level" (shown via reference numeral 504 in FIG. 5). If flash wear level is high then destaging just the modified data is beneficial. The pseudocode is as follows:

```
If flash wear level is high increment IndividualTrackScore by 1
If flash wear level is low increment FullStrideScore by 1 and StripScore
by 1.
```

Block 1206 describes the drive life factor of "WritePer-Day classification of the drive" (shown via reference numeral 506 in FIG. 5). The higher the write per day classification, the more is the data that can be destaged without wearing out the flash. It is better to do full stride destages when write per day classification is high. The pseudocode is as follows:

```
If Write Per Day classification is low, increment IndividualTrackScore
by 1
If Write Per Day classification is high, increment FullStrideScore by 1 and
StripScore by 1.
```

Figure 13:
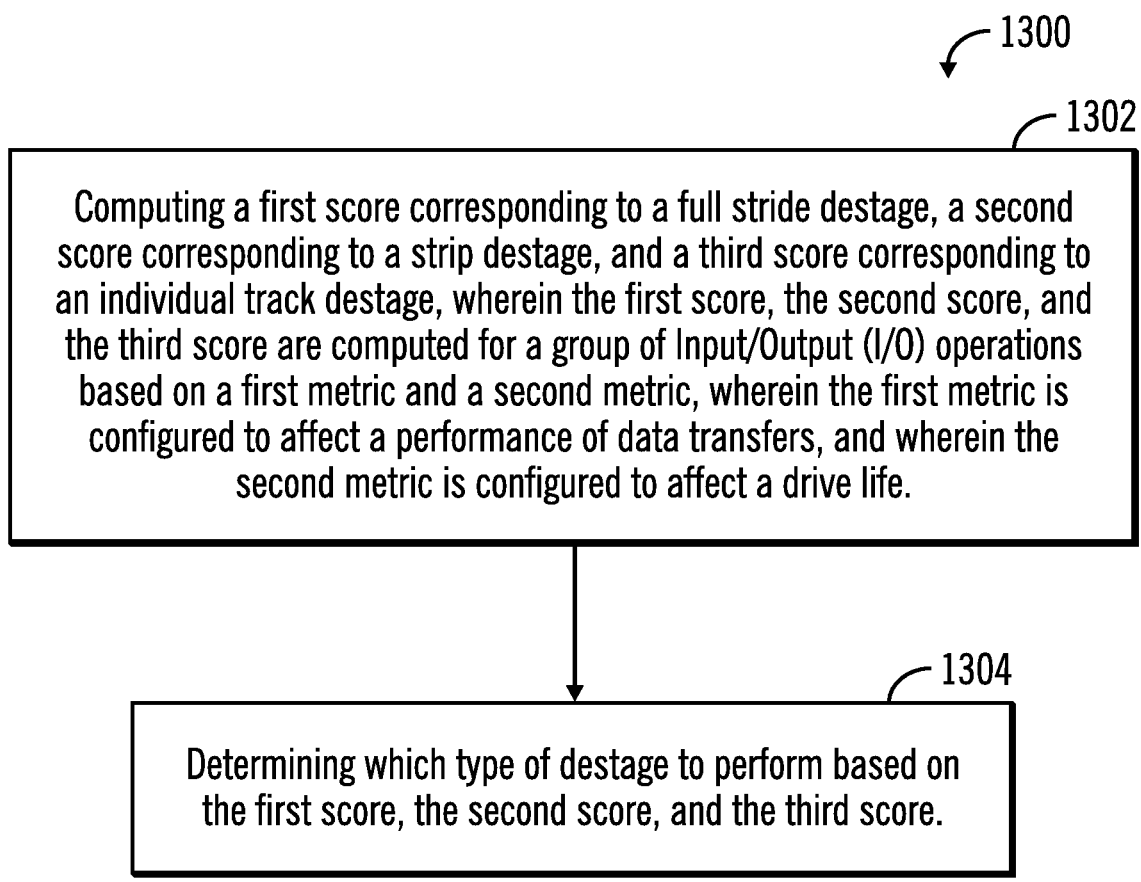
FIG. 13 illustrates a flowchart for selecting a type of destage to perform, in accordance with certain embodiments.

FIG. 13 illustrates a flowchart for selecting a type of destage to perform, in accordance with certain embodiments. In certain embodiments, the operations shown in FIG. 13 may be performed by the destage management application 116 that executes in the storage controller 102.

Control starts at block 1300 in which s first score corresponding to a full stride destage, a second score corresponding to a strip destage, and a third score corresponding to an individual track destage are computed, wherein the first score, the second score, and the third score are computed for a group of Input/Output (I/O) operations based on a first metric and a second metric, wherein the first metric is configured to affect a performance of data transfers, and wherein the second metric is configured to affect a drive life.

From block 1302 control proceeds to block 1304 in which a determination is made of a type of destage to perform based on the first score, the second score, and the third score. In certain embodiments, the type of destage to perform is determined to be full stride destage, in response to determining that the first score is a highest score among the first score, the second score and the third score. In certain embodiments, the type of destage to perform is determined to be strip destage, in response to determining that the second score is a highest score among the first score, the second score and the third score. In certain embodiments, the type of destage to perform is determined to be individual track destage, in response to determining that the third score is a highest score among the first score, the second score and the third score.

In additional embodiments, the first metric that is configured to affect the performance of data transfers includes I/O operations and bandwidth on a rank, non-volatile storage (NVS) capacity, parity lock contention, and holes and unmodified data in a stride. The second metric that is configured to affect the drive life includes a wear level of a drive, writes per day classification of the drive, and an amount of modified data in the stride.

In certain embodiments, a first weightage 120 for the first metric, and a second weightage 122 for the second metric are read from a configuration data structure 118. The computing of the first score, the second score, and the third score is based on the first weightage being provided to first subscores that are computed based on the first metric, and second weightage being provided to second subscores that are computed based on the second metric.

While the embodiments described in FIGS. 1-13 show certain increments to the variables FullStrideScore, the StripScore, and the IndividualTrackScore, in alternative embodiments other increments may be used. For example, instead of incrementing by 1 and 2, alternative embodiments may increment by X and Y respectively, where X and Y are natural numbers and Y is greater than X. Similarly, certain percentages shown in the in embodiments may differ in alternative embodiments. There are other parameters in the embodiments to which certain representative values have been assigned, and these parameters may differ in alternative embodiments.

Therefore, FIGS. 1-13 illustrate certain embodiments to determine the type of destage to perform to adhere to weights for performance and weights for drive life provided in a configuration data structure.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 14:
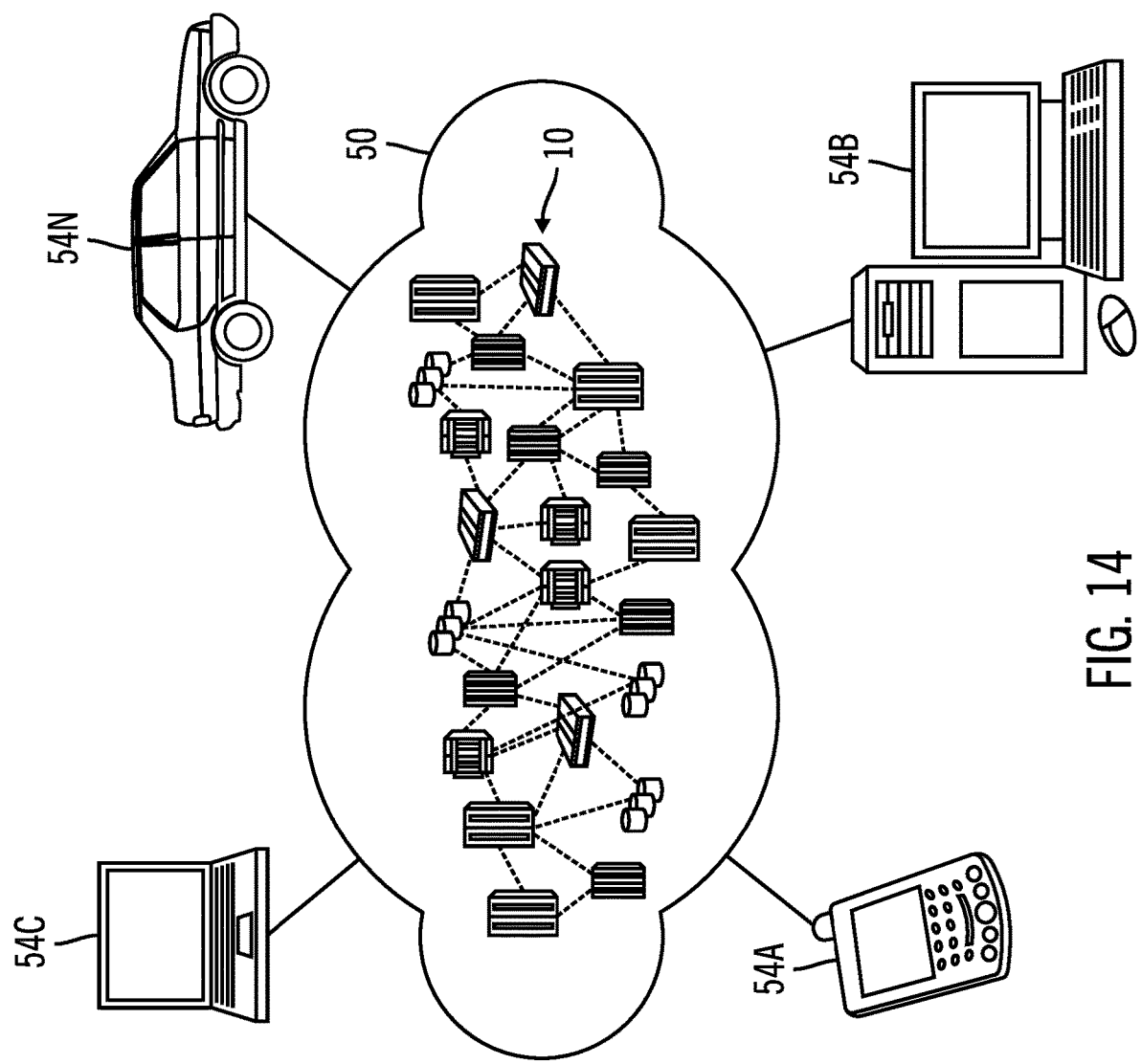
FIG. 14 illustrates a block diagram of a cloud computing environment, in accordance with certain embodiments.

Referring now to FIG. 14 an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 14 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 15:
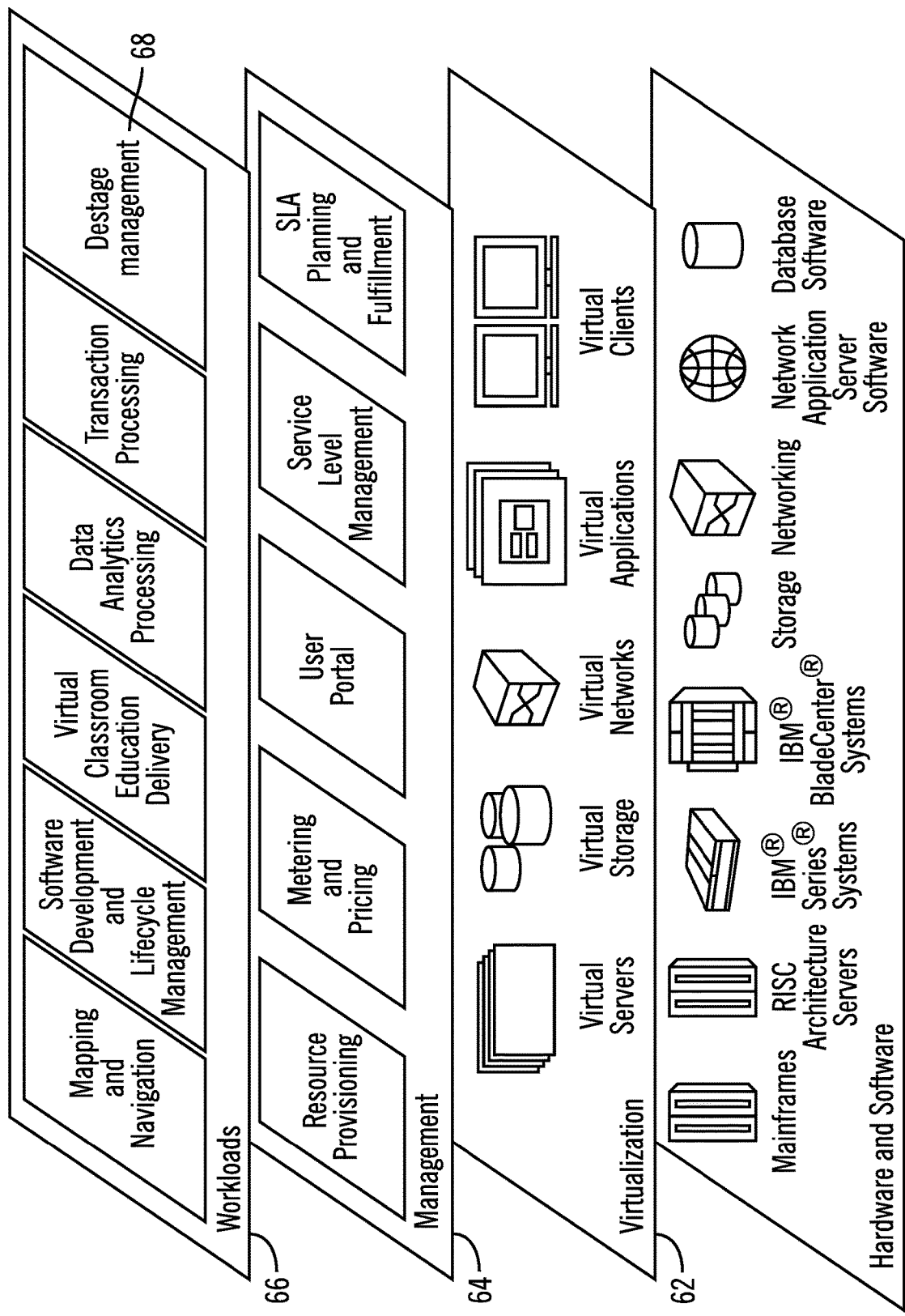
FIG. 15 illustrates a block diagram of further details of the cloud computing environment of FIG. 14, in accordance with certain embodiments.

Referring now to FIG. 15, a set of functional abstraction layers provided by cloud computing environment 50 (FIG. 14) is shown. It should be understood in advance that the components, layers, and functions shown in FIG. 15 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and destage management 68 as shown in FIGS. 1-15.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 16:
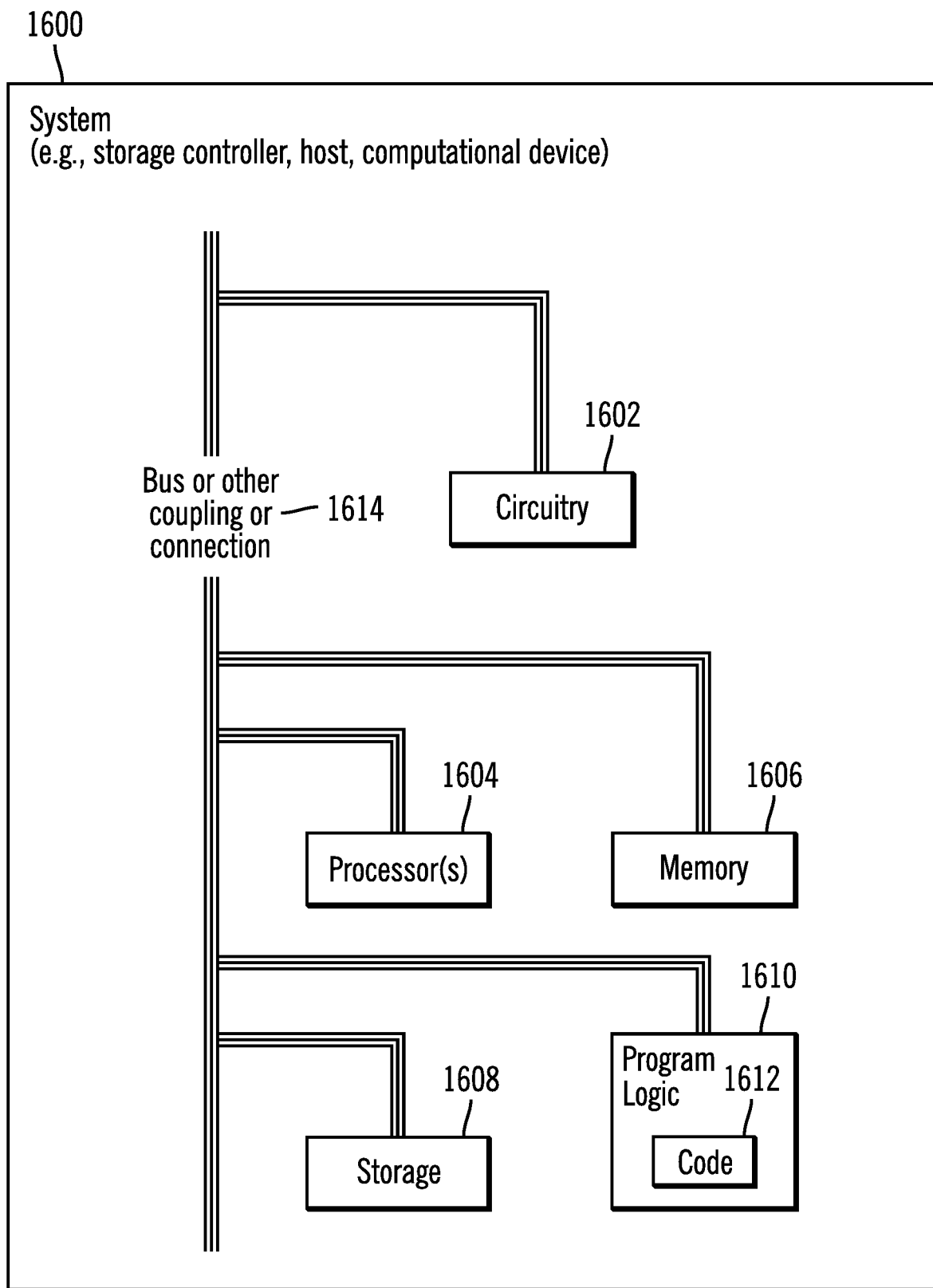
FIG. 16 illustrates a block diagram of a computational system that shows certain elements that may be included in the storage controller or the host, as described in FIGS. 1-15, in accordance with certain embodiments.

FIG. 16 illustrates a block diagram that shows certain elements that may be included in the storage controller 102 or the host 108, or other computational devices in accordance with certain embodiments. The system 1600 may include a circuitry 1602 that may in certain embodiments include at least a processor 1604. The system 1600 may also include a memory 1606 (e.g., a volatile memory device), and storage 1608. The storage 1608 may include a non-volatile memory device (e.g., EEPROM, ROM, PROM, flash, firmware, programmable logic, etc.), magnetic disk drive, optical disk drive, tape drive, etc. The storage 1608 may comprise an internal storage device, an attached storage device and/or a network accessible storage device. The system 1600 may include a program logic 1610 including code 1612 that may be loaded into the memory 1606 and executed by the processor 1604 or circuitry 1602. In certain embodiments, the program logic 1610 including code 1612 may be stored in the storage 1608. In certain other embodiments, the program logic 1610 may be implemented in the circuitry 1602. One or more of the components in the system 1600 may communicate via a bus or via other coupling or connection 1614. Therefore, while FIG. 16 shows the program logic 1610 separately from the other elements, the program logic 1610 may be implemented in the memory 1606 and/or the circuitry 1602.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
computing a first score corresponding to a full stride destage, a second score corresponding to a strip destage, and a third score corresponding to an individual track destage, wherein the first score, the second score, and the third score are computed for a group of Input/Output (I/O) operations based on a first metric and a second metric, wherein the first metric is configured to affect a performance of data transfers, and wherein the second metric is configured to affect a drive life, wherein in response to data being written sequentially on storage, the first score is incremented more in comparison to the second score, and wherein the third score is incremented for a first flash wear level that is greater than a second flash wear level, and the first score and the second score are incremented for the second flash wear level; and
determining which type of destage to perform based on the first score, the second score, and the third score, and performing the determined type of destage.

2. The method of claim 1, wherein the first metric that is configured to affect the performance of data transfers includes I/O operations and bandwidth on a rank, non-volatile storage (NVS) capacity, parity lock contention, holes, and unmodified data in a stride.

3. The method of claim 2, wherein the second metric that is configured to affect the drive life includes a wear level of a drive, writes per day classification of the drive, and an amount of modified data in the stride.

4. The method of claim 3, the method further comprising:
in response to determining that the first score is a highest score among the first score, the second score and the third score, performing the full stride destage.

5. The method of claim 3, the method further comprising:
in response to determining that the second score is a highest score among the first score, the second score and the third score, performing the strip destage.

6. The method of claim 3, the method further comprising:
in response to determining that the third score is a highest score among the first score, the second score and the third score, performing the individual track destage.

7. The method of claim 1, the method further comprising:
reading from a configuration data structure, a first weightage for the first metric, and a second weightage for the second metric; and
computing the first score, the second score, and the third score based on the first weightage being provided to first subscores that are computed based on the first metric, and on the second weightage being provided to second subscores that are computed based on the second metric.

8. A system, comprising:
a memory; and a processor coupled to the memory, wherein the processor performs operations, the operations performed by the processor comprising:

computing a first score corresponding to a full stride destage, a second score corresponding to a strip destage, and a third score corresponding to an individual track destage, wherein the first score, the second score, and the third score are computed for a group of Input/Output (I/O) operations based on a first metric and a second metric, wherein the first metric is configured to affect a performance of data transfers, and wherein the second metric is configured to affect a drive life, wherein in response to data being written sequentially on storage, the first score is incremented more in comparison to the second score, and wherein the third score is incremented for a first flash wear level that is greater than a second flash wear level, and the first score and the second score are incremented for the second flash wear level; and determining which type of destage to perform based on the first score, the second score, and the third score, and performing the determined type of destage.

9. The system of claim 8, wherein the first metric that is configured to affect the performance of data transfers includes I/O operations and bandwidth on a rank, non-volatile storage (NVS) capacity, parity lock contention, holes, and unmodified data in a stride.

10. The system of claim 9, wherein the second metric that is configured to affect the drive life includes a wear level of a drive, writes per day classification of the drive, and an amount of modified data in the stride.

11. The system of claim 10, the operations further comprising:

in response to determining that the first score is a highest score among the first score, the second score and the third score, performing the full stride destage.

12. The system of claim 10, the operations further comprising:

in response to determining that the second score is a highest score among the first score, the second score and the third score, performing the strip destage.

13. The system of claim 10, the operations further comprising:

in response to determining that the third score is a highest score among the first score, the second score and the third score, performing the individual track destage.

14. The system of claim 8, the operations further comprising:

reading from a configuration data structure, a first weightage for the first metric, and a second weightage for the second metric; and computing the first score, the second score, and the third score based on the first weightage being provided to first subscores that are computed based on the first metric, and on the second weightage being provided to second subscores that are computed based on the second metric.

15. A computer program product, the computer program product comprising a computer readable storage medium having computer readable program code embodied therewith, the computer readable program code configured to perform operations, the operations comprising:

computing a first score corresponding to a full stride destage, a second score corresponding to a strip destage, and a third score corresponding to an individual track destage, wherein the first score, the second score, and the third score are computed for a group of Input/Output (I/O) operations based on a first metric and a second metric, wherein the first metric is configured to affect a performance of data transfers, and wherein the second metric is configured to affect a drive life, wherein in response to data being written sequentially on storage, the first score is incremented more in comparison to the second score, and wherein the third score is incremented for a first flash wear level that is greater than a second flash wear level, and the first score and the second score are incremented for the second flash wear level; and determining which type of destage to perform based on the first score, the second score, and the third score, and performing the determined type of destage.

16. The computer program product of claim 15, wherein the first metric that is configured to affect the performance of data transfers includes I/O operations and bandwidth on a rank, non-volatile storage (NVS) capacity, parity lock contention, holes, and unmodified data in a stride.

17. The computer program product of claim 16, wherein the second metric that is configured to affect the drive life includes a wear level of a drive, writes per day classification of the drive, and an amount of modified data in the stride.

18. The computer program product of claim 17, the operations further comprising:

in response to determining that the first score is a highest score among the first score, the second score and the third score, performing the full stride destage.

19. The computer program product of claim 17, the operations further comprising:

in response to determining that the second score is a highest score among the first score, the second score and the third score, performing the strip destage.

20. The computer program product of claim 17, the operations further comprising:

in response to determining that the third score is a highest score among the first score, the second score and the third score, performing the individual track destage.

* * * * *